United States Patent Office 3,657,401
Patented Apr. 18, 1972

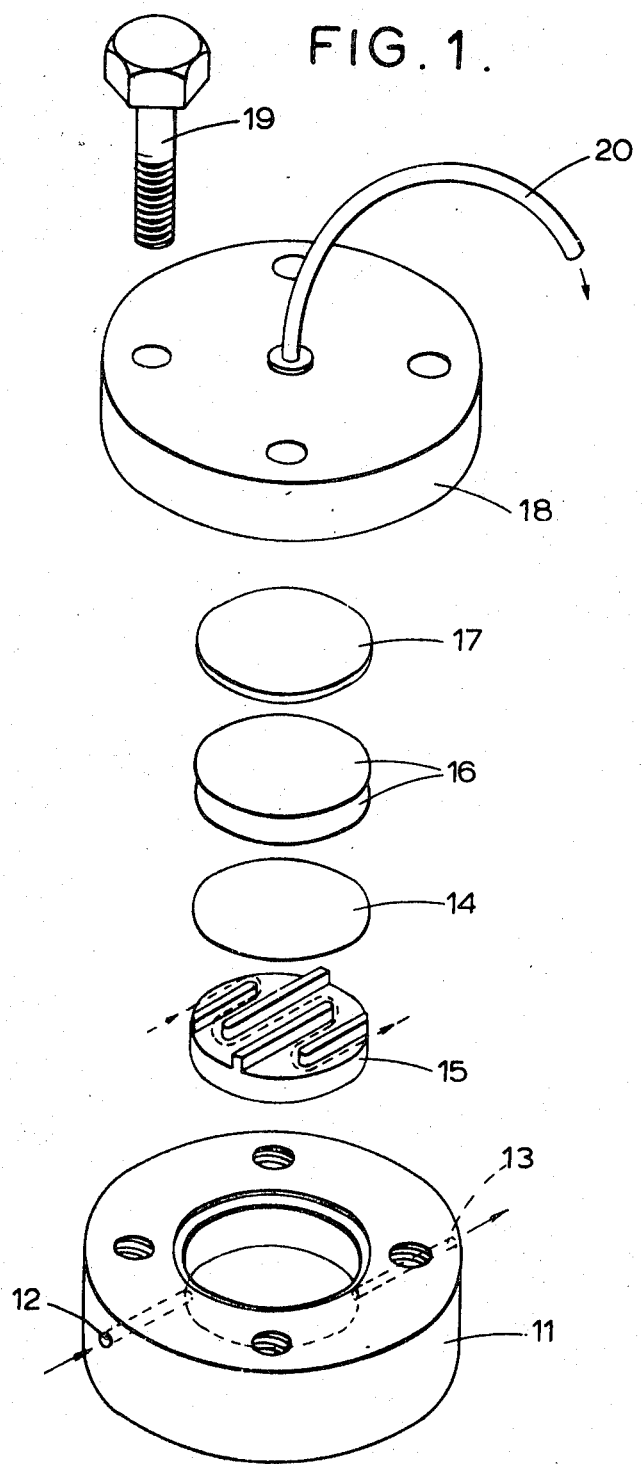

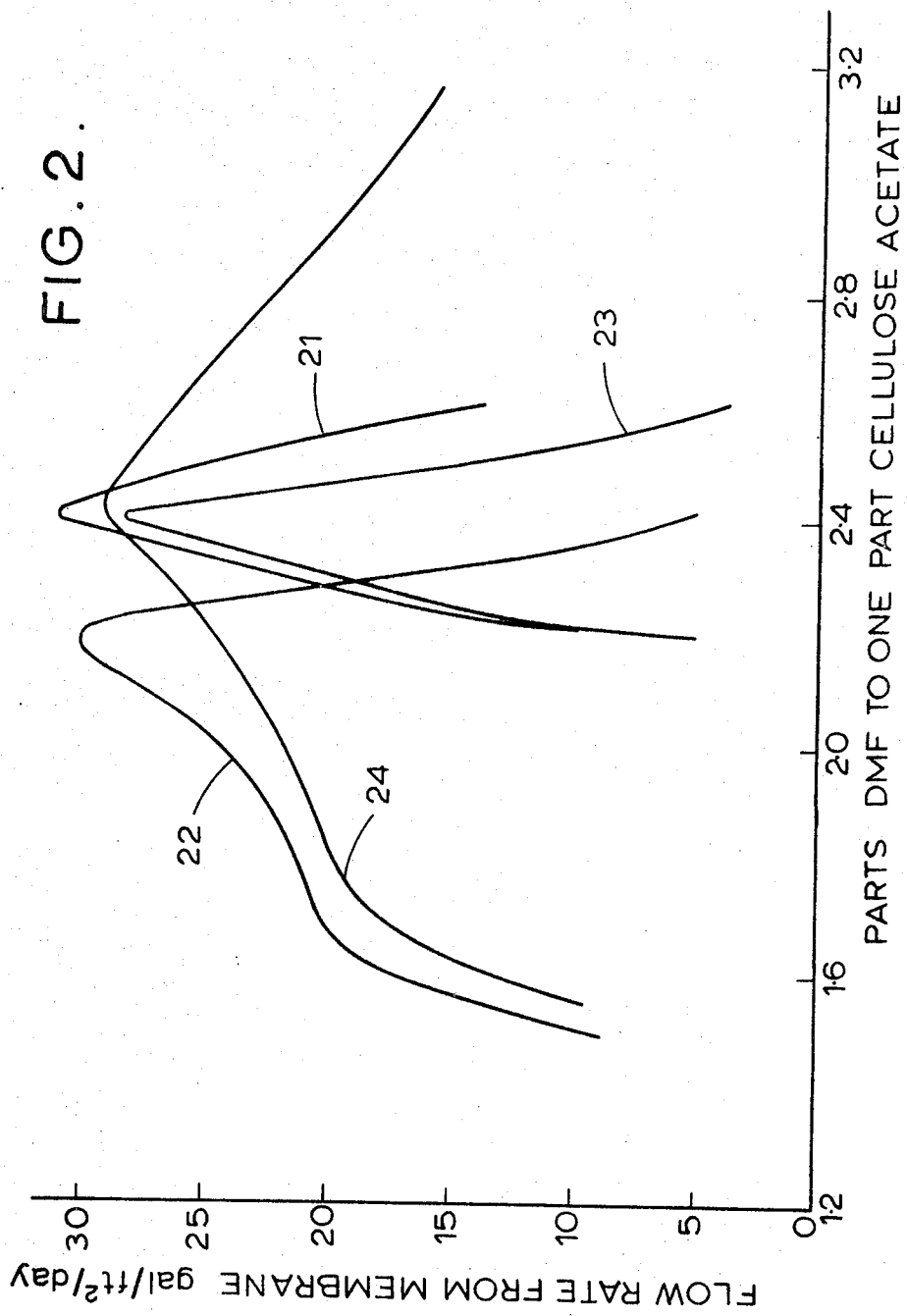

3,657,401
REVERSE OSMOSIS MEMBRANES
Victor James Shayler, Woodstock, and Gordon Arthur Leslie Wells, Witney, England, assignors to Pressed Steel Fisher Limited, Cowley, Oxford, England
Filed June 15, 1970, Ser. No. 46,206
Claims priority, application Great Britain, June 16, 1969, 30,344/69
Int. Cl. B29d 27/00; B29k 7/20
U.S. Cl. 264—41
3 Claims

ABSTRACT OF THE DISCLOSURE

A reverse osmosis membrane is prepared by casting a solution of cellulose acetate, dimethylformamide and acetone wherein the dimethylformamide is present in the proportion of from 50–70 parts by weight to 25 parts by weight of cellulose acetate, and the cast membrane is then washed in cold water and annealed in hot water as in known methods. The use of dimethylformamide in the above proportions allows membranes to be prepared which give improved flux rates as compared with membranes cast from known ternary casting solutions that comprise cellulose acetate, acetone and known swelling or flux inducing additives.

This invention relates to the preparation of reverse osmosis membranes, that is to say, semipermeable membranes which permit a solvent, such as water, to pass therethrough from a solution in such solvent to a more dilute solution or the pure solvent.

Reverse osmosis membranes have applications in the desalination of water and in the concentration of, or recovery of water from, industrial effluents. In one known example of the production of membranes of this type, a film is cast from a solution of cellulose acetate containing a swelling or flux-inducing additive which additive confers semipermeability on the cast film. After being at least partially dried, the film is washed in ice water to remove residual water-soluble material and is then immersed for a short time in hot water, for example for 5 minutes at 65–85° C.

The present invention now provides a method which makes it possible to produce reverse osmosis membranes which give improved flux rates or throughput. This method is characterized by the use of a casting solution consisting essentially of cellulose acetate, acetone and dimethylformamide, the latter component being present in a proportion of 2.0–2.8 parts by weight to 1.0 part by weight of cellulose acetate.

In order to achieve the highest possible flux rates, it is particularly important not to subject the film to an excessively severe hot water treatment. The preferred treatments do not exceed 20 minutes at a temperature not exceeding 80° C. but, as will be apparent from the following description, the actual treatment that is required to achieve the highest flux rate is slightly different for different proportions of dimethylformamide to cellulose acetate within the range according to the invention, and the appropriate treatment for any particular proportions can be readily determined by a few simple tests.

Moreover, as already known in the art of desalination membranes in the case of other swelling agents it appears that for good membrane performance the acetyl content of the cellulose acetate should preferably be between 37.5% and 40.1% acetyl content.

Exemplary embodiments of the invention will now be further described with reference to the following examples and to the accompanying drawings in which:

FIG. 1 is an exploded view of an apparatus used for measuring flux rate, and

FIG. 2 is a graph of flux rates plotted against grams of dimethylformamide per gram of cellulose acetate for membranes which have been subject to different hot water, or "annealing," treatments.

EXAMPLE 1

A casting solution was prepared from 10 grams cellulose acetate (commercially available from the Eastman-Kodak Company as "EK 398–3") and 24 grams dimethylformamide (DMF) which were well stirred with sufficient acetone to ensure complete dissolution. The casting solution was covered and allowed to stand until all entrapped air had risen to the surface and been dissipated.

The casting solution was poured onto a glass which was recessed 0.005 inch in a metal surround, and spread evenly with a doctor blade.

The cast film was allowed to stand in air at 20° C. for four minutes to allow some of the acetone to evaporate.

The cast film was then immersed in iced water for one hour to leach out the remaining acetone and DMF.

The film was then stripped from the glass and immersed in water at 80° C. for ten minutes to "anneal" the film.

The film was then mounted as a reverse osmosis membrane in the flux measuring apparatus illustrated in FIG. 1.

This apparatus comprises a base member 11 having an inlet 12, which is connected through a pressure control valve (not shown) and pressure accummulator (not shown) to a high pressure pump (not shown) fed from a suitable reservoir (not shown), and an outlet 13 which was also connected to the reservoir; the inlet 12 and the outlet 13 are mutually offset such that their axes form separate, but parallel, chords with respect to the circumference of a recess in the base member 11.

The membrane 14 is inserted into the base 11 between a veined member 15 and two filter papers 16 which are supported by a porous sintered phospher bronze disc 17, and the apparatus is sealed by top member 18 which was bolted, by bolts such as 19, to the base 11. The arrangement is such that the flow across the membrane is as shown by the arrows.

The top member 18 has an outlet pipe 20 which was arranged to discharge into a burette (not shown).

Paint which essentially comprises a suspension/emulsion of pigmented epoxy resin (of average molecular weight 4,000) in water with small amounts of n-butanol and linseed oil fatty acids and which has an overall average osmotic pressure of about 20 p.s.i. was fed into the reservior.

The control valve was adjusted to provide a pressure difference of 800 p.s.i.g. across the membrane 14, and the flux rate was measured, from the discharge into the burette, and was found to be about 31 gals./sq. ft./day.

The experiment was then repeated with various proportions of DMF for each gram of cellulose acetate, and the results were plotted on the graph where they are shown as curve 21.

EXAMPLE II

The above experiments were repeated except that "annealing" was effected at 80° C. for 5 minutes and the results are shown as curve 22.

EXAMPLE III

The above experiments were repeated except that "annealing" was effected at 80° C. for 20 minutes and the results are shown as curve 23.

EXAMPLE IV

The above experiments were repeated except that "annealing" was effected at 60° C. for 2 minutes and the results are shown as curve 24.

EXAMPLE V

The above experiments were repeated with different evaporating temperatures and times, but it was found that changes in these variables did not produce a significant change in flux rate and that the above values are around the optimum.

From the graphs it will be seen that membranes formed from a casting solution comprising between 2.0 and 2.8 parts by weight of DMF to each part by weight of cellulose acetate provide specially advantageous flux rates provided that annealing has been effected at an appropriate temperature for an appropriate time.

What is claimed is:

1. A process for preparing a reverse osmosis membrane comprising the following steps:
   (a) casting a film from a solution of cellulose acetate, dimethylformamide and acetone wherein the dimethylformamide is present in the proportion of 50–70 parts by weight to 25 parts by weight of cellulose acetate,
   (b) partially drying said film.
   (c) removing residual dimethylformamide and acetone by washing said partially dried film in water, and then
   (d) annealing said film in hot water at a temperature not exceeding 80° C. for a time not exceeding 20 minutes.

2. A process according to claim 1, wherein the dimethylformamide in the casting solution is present in the proportion of 52.5 to 62.5 parts by weight to 25 parts by weight of cellulose acetate.

3. A process according to claim 2, wherein the film is annealed in hot water at a temperature of 60–80° C. for 2 to 10 minutes.

References Cited

UNITED STATES PATENTS 3,412,184    11/1968    Sharples et al. _____ 264—41 X

OTHER REFERENCES

Manjikian, S., "Improvement in Fabrication Techniques for Reverse Osmosis Desalination Membranes," International Symposium on Water Desalination, Oct. 3–9, 1965, Washington, D.C., SWD/12, pp. 1–7, 13.

PHILIP E. ANDERSON, Primary Examiner

U.S. Cl. X.R.

106—196; 210—500; 264—235, 299